(12) United States Patent
Pilutti et al.

(10) Patent No.: US 10,414,437 B2
(45) Date of Patent: Sep. 17, 2019

(54) HITCH ASSIST SYSTEM FOR CORRECTING MISALIGNMENT BETWEEN A TOW HITCH OF A VEHICLE AND A HITCH COUPLER OF A TRAILER

(71) Applicant: Ford Global Technologies, LLC, Dearborn, MI (US)

(72) Inventors: Thomas Edward Pilutti, Ann Arbor, MI (US); Luke Niewiadomski, Hamtramck, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 15/724,760

(22) Filed: Oct. 4, 2017

(65) Prior Publication Data

US 2019/0100246 A1  Apr. 4, 2019

(51) Int. Cl.
| | |
|---|---|
| *B62D 15/02* | (2006.01) |
| *B60D 1/62* | (2006.01) |
| *B60R 1/00* | (2006.01) |
| *B60D 1/36* | (2006.01) |
| *B60D 1/06* | (2006.01) |
| *B60W 30/06* | (2006.01) |

(52) U.S. Cl.
CPC ........... *B62D 15/0285* (2013.01); *B60D 1/06* (2013.01); *B60D 1/36* (2013.01); *B60D 1/62* (2013.01); *B60R 1/00* (2013.01); *B60R 1/003* (2013.01); *B60D 1/065* (2013.01); *B60R 2300/808* (2013.01); *B60W 30/06* (2013.01)

(58) Field of Classification Search
CPC ....... B62D 15/0285; B60R 1/003; B60R 1/00; B60R 2300/808; B60D 1/36; B60D 1/06; B60D 1/62; B60D 1/065; B60W 30/06
See application file for complete search history.

(56) References Cited

U.S. PATENT DOCUMENTS

| | | | |
|---|---|---|---|
| 5,277,447 A * | 1/1994 | Blaser | B60D 1/40 280/478.1 |
| 7,739,015 B2 | 6/2010 | Senneff et al. | |
| 9,140,553 B2 | 9/2015 | Grimm et al. | |
| 9,233,710 B2 * | 1/2016 | Lavoie | B62D 13/06 |
| 9,428,220 B2 * | 8/2016 | Hueger | B62D 13/06 |
| 2012/0283909 A1 | 11/2012 | Dix | |
| 2013/0226390 A1 * | 8/2013 | Luo | B60D 1/36 701/25 |
| 2013/0253814 A1 * | 9/2013 | Wirthlin | G01G 19/02 701/124 |
| 2014/0085472 A1 * | 3/2014 | Lu | B60R 1/002 348/148 |
| 2014/0226009 A1 * | 8/2014 | Lynam | B60K 35/00 348/148 |
| 2014/0229070 A1 * | 8/2014 | Witting | B62D 13/06 701/42 |

(Continued)

*Primary Examiner* — Mussa A Shaawat
(74) *Attorney, Agent, or Firm* — Raymond Coppiellie; Price Heneveld LLP

(57) ABSTRACT

A hitch assist system is provided herein. A human machine interface is configured to receive user-input for adjusting a pre-hitch position of a tow hitch of a vehicle. A controller is configured to generate commands for maneuvering the vehicle such that the tow hitch is moved to an adjusted pre-hitch position at which the tow hitch is aligned with a hitch coupler of a trailer.

14 Claims, 5 Drawing Sheets

(56) References Cited

U.S. PATENT DOCUMENTS

| | | | |
|---|---|---|---|
| 2014/0249723 A1* | 9/2014 | Pilutti | B62D 15/027 701/42 |
| 2015/0321697 A1* | 11/2015 | Lu | B60D 1/245 701/28 |
| 2016/0052548 A1* | 2/2016 | Singh | B60D 1/36 701/37 |
| 2016/0378118 A1* | 12/2016 | Zeng | G05D 1/0246 701/28 |
| 2017/0174130 A1* | 6/2017 | Hu | B60R 1/00 |
| 2018/0222265 A1* | 8/2018 | Recker | B60D 1/065 |
| 2019/0094872 A1* | 3/2019 | Li | G05D 1/0231 |

* cited by examiner

HITCH ASSIST SYSTEM FOR CORRECTING MISALIGNMENT BETWEEN A TOW HITCH OF A VEHICLE AND A HITCH COUPLER OF A TRAILER

FIELD OF THE INVENTION

The present invention generally relates to systems that assist a user with hitching a vehicle to a trailer, and more particularly, to systems capable of correcting misalignment between a tow hitch and a hitch coupler.

BACKGROUND OF THE INVENTION

Hitch assist systems are known to maneuver a vehicle toward a trailer so that a hitch connection can be made between a tow hitch and hitch coupler. In some instances, the tow hitch is misaligned with the hitch coupler upon completion of the maneuver. As a result, the vehicle or trailer must be repositioned so as to properly align the tow hitch with the hitch coupler. Accordingly, there is a need for a hitch assist system that is capable of correcting misalignment between a tow hitch and a hitch coupler. The present disclosure is intended to satisfy this need.

SUMMARY OF THE INVENTION

According to a first aspect of the present invention, a hitch assist system is provided. A human machine interface is configured to receive user-input for adjusting a pre-hitch position of a tow hitch of a vehicle. A controller is configured to generate commands for maneuvering the vehicle such that the tow hitch is moved to an adjusted pre-hitch position at which the tow hitch is aligned with a hitch coupler of a trailer.

Embodiments of the first aspect of the invention can include any one or a combination of the following features:
- the human machine interface includes a touchscreen display configured to display a view of the tow hitch in the pre-hitch position and register one or more touch events thereon for adjusting the pre-hitch position of the tow hitch;
- the touchscreen display is configured to generate a graphical icon having multiple touchpoints for adjusting the pre-hitch position of the tow hitch;
- the touchpoints allow adjustment of the pre-hitch position in at least one of a lateral direction and a longitudinal direction;
- the graphical icon is configured to display a difference in position between the pre-hitch position of the tow hitch and the adjusted pre-hitch position of the tow hitch;
- the touchscreen display is configured to generate an indicator graphically representing the pre-hitch position of the tow hitch and movable in response to each touch event;
- the touchpoints are graphically represented as arrows and each touch event on a given touchpoint incrementally moves the indicator in a direction specified by the corresponding arrow;
- the controller is configured to determine a difference in position between the pre-hitch position and the adjusted pre-hitch position;
- the controller stores the difference in position to memory and applies the difference in position to future maneuvers of the vehicle toward the trailer; and
- the tow hitch comprises a hitch ball and the hitch coupler comprises a coupler ball socket.

According to a second aspect of the present invention, a human machine interface of a vehicle having a tow hitch is provided. A touchscreen display is configured to display a view of the tow hitch in a pre-hitch position proximate a hitch coupler of a trailer and register one or more touch events thereon for adjusting the pre-hitch position of the tow hitch to correct misalignment between the tow hitch and the hitch coupler.

Embodiments of the second aspect of the invention can include any one or a combination of the following features:
- the touchscreen display is configured to generate a graphical icon having multiple touchpoints for adjusting the pre-hitch position of the tow hitch;
- the touchpoints allow adjustment of the pre-hitch position in at least one of a lateral direction and a longitudinal direction;
- the graphical icon is configured to display a difference in position between the pre-hitch position of the tow hitch and an adjusted pre-hitch position of the tow hitch;
- the touchscreen display is configured to generate an indicator graphically representing the pre-hitch position of the tow hitch and movable in response to each touch event; and
- the touchpoints are graphically represented as arrows and each touch event on a given touchpoint incrementally moves the indicator in a direction specified by the corresponding arrow.

According to a third aspect of the present invention, a method is provided for correcting misalignment between a tow hitch of a vehicle and a hitch coupler of a trailer. The method includes the steps of receiving user-input via a human machine interface for adjusting a pre-hitch position of the tow hitch and providing a controller for generating commands for maneuvering the vehicle such that the tow hitch is moved to an adjusted pre-hitch position at which the tow hitch is aligned with the hitch coupler.

Embodiments of the third aspect of the invention can include any one or a combination of the following features:
- the step of determining a difference in position between the pre-hitch position of the tow hitch and the adjusted pre-hitch position of the tow hitch;
- the step of storing the difference in position to memory; and
- the step of applying the difference in position to future maneuvers of the vehicle toward the trailer.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
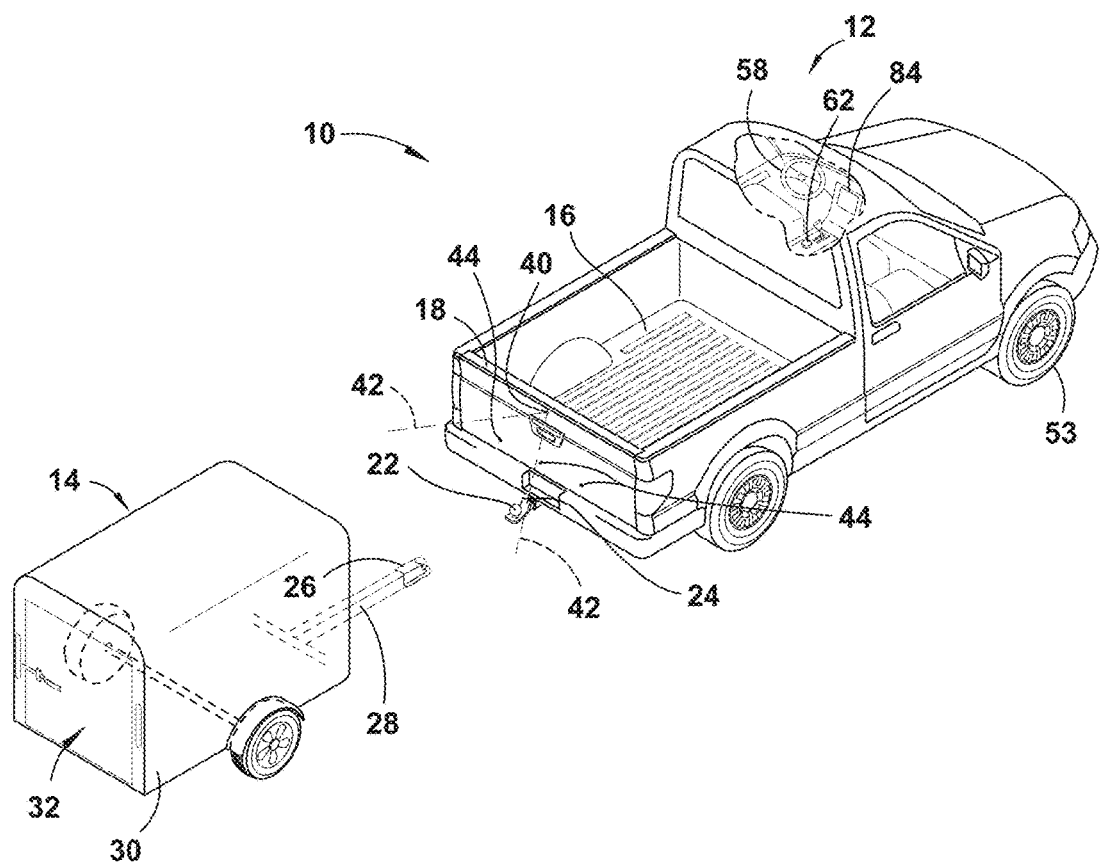
FIG. 1 is a top perspective view of a vehicle and a trailer, the vehicle being equipped with a hitch assist system according to one embodiment.
Figure 2:
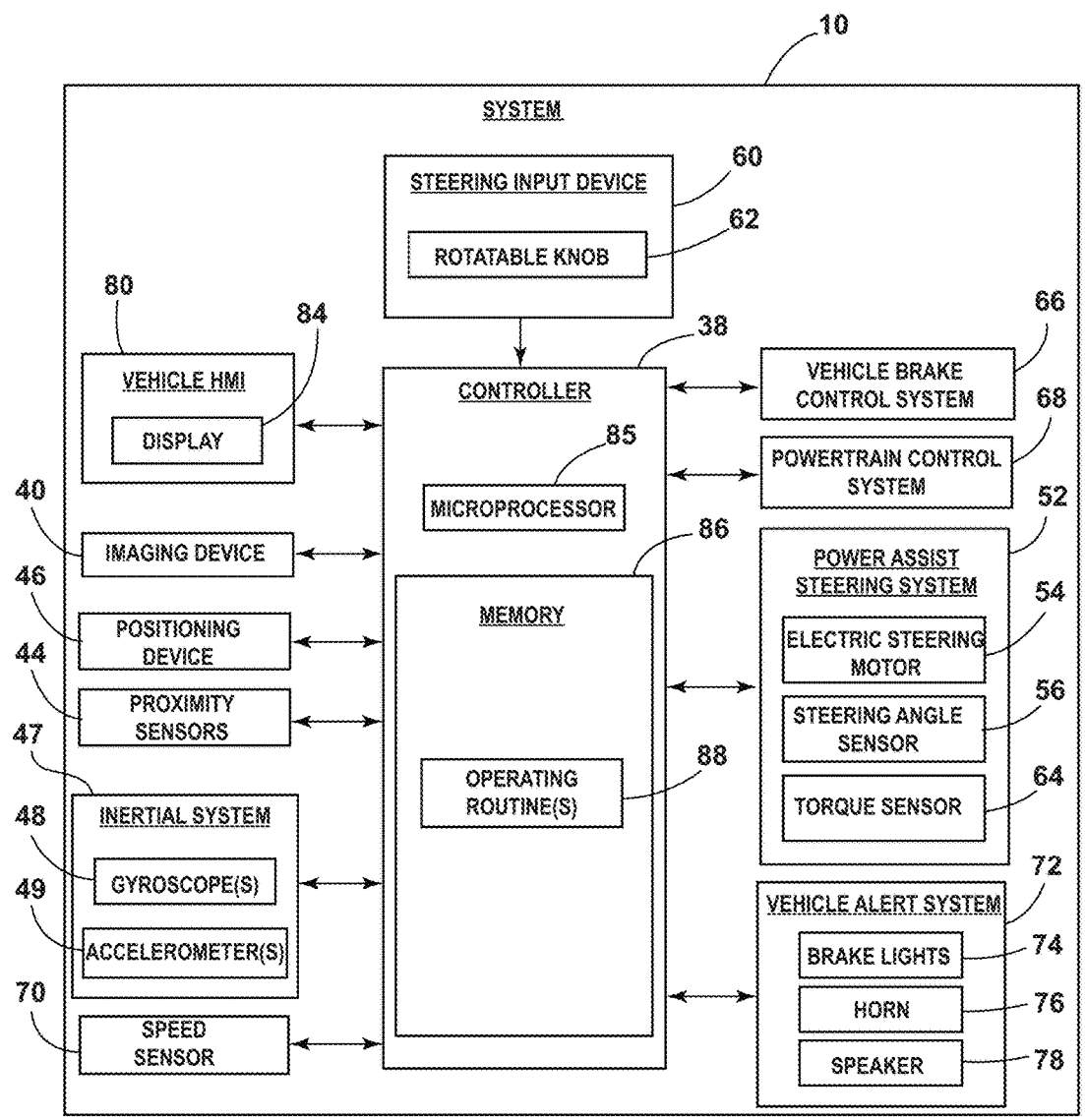
FIG. 2 is a block diagram illustrating the hitch assist system.

Referring to FIGS. 1 and 2, reference numeral 10 generally designates a hitch assist system for hitching a vehicle 12 to a trailer 14. As shown in FIG. 1, the vehicle 12 is exemplarily embodied as a pickup truck having a truck bed 16 that is accessible via a fold-down tailgate 18. The vehicle 12 also includes a tow hitch in the form of a hitch ball 22 extending from a drawbar 24 that is coupled to the rear of the vehicle 12. The hitch ball 22 is configured to be received by a hitch coupler in the form of a coupler ball socket 26 that is provided at a terminal end of a trailer tongue 28. The trailer 14 is exemplarily embodied as a single axle trailer having a box frame 30 with an enclosed cargo area 32 from which the tongue 28 extends longitudinally.

The system 10 includes a controller 38 in communication with an imaging device 40 located at the rear of the vehicle 12. The imaging device 40 may be centrally located at an upper region of the tailgate 18 such that the imaging device 40 is elevated relative to the drawbar 24 and the hitch ball 22. The imaging device 40 has a field of view 42 located and oriented to capture one or more images of a rear-vehicle scene that generally includes the hitch ball 22, among other things. Images captured by the imaging device 40 may be processed by the controller 38 to identify a hitch coupler such as the coupler ball socket 26. It is contemplated that the coupler ball socket 26 may be identified using any known imaging techniques.

In addition to communicating with the imaging device 40, the controller 38 may communicate with a number of proximity sensors 44 exemplarily shown as ultrasonic sensors or radar sensors spaced across a lower region of the vehicle tailgate 18 and configured to detect the proximity or distance of objects located rearward of the vehicle 12. With reference to the embodiment of the system 10 shown in FIG. 2, additional vehicle-related information may be provided to the controller 38 by a positioning device 46, such as a global positioning system (GPS) located on the vehicle 12 and/or the trailer 14. Additionally, the controller 38 may communicate with an inertial system 47 including one or more gyroscopes 48 and accelerometers 49 to measure the position, orientation, direction, and/or speed of the vehicle 12.

To enable autonomous or semi-autonomous control of the vehicle 12, the controller 38 of system 10 may be further configured to communicate with a variety of vehicle equipment. According to one embodiment, the controller 38 of the system 10 may control a power assist steering system 52 of the vehicle 12 to operate the steered wheels 53 of the vehicle 12 while the vehicle 12 is reversed toward the trailer 14 along a vehicle backup path. The power assist steering system 52 may be an electric power-assisted steering (EPAS) system that includes an electric steering motor 54 for turning the steered wheels 53 to a steering angle based on a steering command generated by the controller 38, whereby the steering angle may be sensed by a steering angle sensor 56 of the power assist steering system 52 and provided to the controller 38. As described herein, the steering command may be provided for autonomously steering the vehicle 12 during a backup maneuver and may alternatively be provided manually via a rotational position (e.g., a steering wheel angle) of a steering wheel 58 or a steering input device 60, which may be provided to enable a driver to control or otherwise modify the desired curvature of the backing path of vehicle 12. The steering input device 60 may be communicatively coupled to the controller 38 in a wired or wireless manner and provides the controller 38 with information defining the desired curvature of the backing path of the vehicle 12. In response, the controller 38 processes the information and generates corresponding steering commands that are supplied to the power assist steering system 52 of the vehicle 12. In one embodiment, the steering input device 60 includes a rotatable knob 62 operable between a number of rotated positions that each provide an incremental change to the desired curvature of the backing path of the vehicle 12.

In some embodiments, the steering wheel 58 of the vehicle 12 may be mechanically coupled with the steered wheels 53 of the vehicle 12, such that the steering wheel 58 moves in concert with steered wheels 53 via an internal torque, thereby preventing manual intervention with the steering wheel 58 during autonomous steering of the vehicle 12. In such instances, the power assist steering system 52 may include a torque sensor 64 that senses torque (e.g., gripping and/or turning) on the steering wheel 58 that is not expected from autonomous control of the steering wheel 58 and is therefore indicative of manual intervention by the driver. In some embodiments, external torque applied to the steering wheel 58 may serve as a signal to the controller 38 that the driver has taken manual control and for the system 10 to discontinue autonomous steering functionality.

The controller 38 of the system 10 may also communicate with a vehicle brake control system 66 of the vehicle 12 to receive vehicle speed information such as individual wheel speeds of the vehicle 12. Additionally or alternatively, vehicle speed information may be provided to the controller 38 by a powertrain control system 68 and/or a vehicle speed sensor 70, among other conceivable means. In some embodiments, the controller 38 may provide braking commands to the vehicle brake control system 66, thereby allowing the system 10 to regulate the speed of the vehicle 12 during a backup maneuver of the vehicle 12. It should be appreciated that the controller 38 may additionally or alternatively regulate the speed of the vehicle 12 via interaction with the powertrain control system 68.

Through interaction with the power assist steering system 52, the vehicle brake control system 66, and/or the powertrain control system 68 of the vehicle 12, the potential for unacceptable backup conditions can be reduced when the vehicle 12 is backing toward the trailer 14. Examples of unacceptable backup conditions include, but are not limited to, a vehicle over-speed condition, sensor failure, and the like. In such circumstances, the driver may be unaware of the failure until the unacceptable backup condition is imminent or already happening. Therefore, it is disclosed herein that the controller 38 of the system 10 can generate an alert signal corresponding to a notification of an actual, impending, and/or anticipated unacceptable backup condition, and prior to driver intervention, generate a counter measure to prevent such an unacceptable backup condition.

According to one embodiment, the controller 38 may communicate with one or more devices, including a vehicle alert system 72, which may prompt visual, auditory, and tactile warnings. For instance, vehicle brake lights 74 and vehicle emergency flashers may provide a visual alert and a vehicle horn 76 and/or speaker 78 may provide an audible alert. Additionally, the controller 38 and/or vehicle alert system 72 may communicate with a human machine interface (HMI) 80 of the vehicle 12. The HMI 80 may include a touchscreen vehicle display 84 (FIG. 1) such as a center-stack mounted navigation or entertainment display capable of displaying images indicating the alert. Such an embodiment may be desirable to notify the driver of the vehicle 12 that an unacceptable backup condition is present.

The controller 38 is configured with a microprocessor 85 and/or other analog and/or digital circuitry for processing one or more logic routines stored in a memory 86. The logic routines may include one or more operating routines 88. Information from the imaging device 40 or other components of the system 10 can be supplied to the controller 38 via a communication network of the vehicle 12, which can include a controller area network (CAN), a local interconnect network (LIN), or other known protocols used in the automotive industry. It should be appreciated that the controller 38 may be a stand-alone dedicated controller or may be a shared controller integrated with the imaging device 40 or other component of the system 10 in addition to any other conceivable onboard or off-board vehicle control systems.

Figure 3:
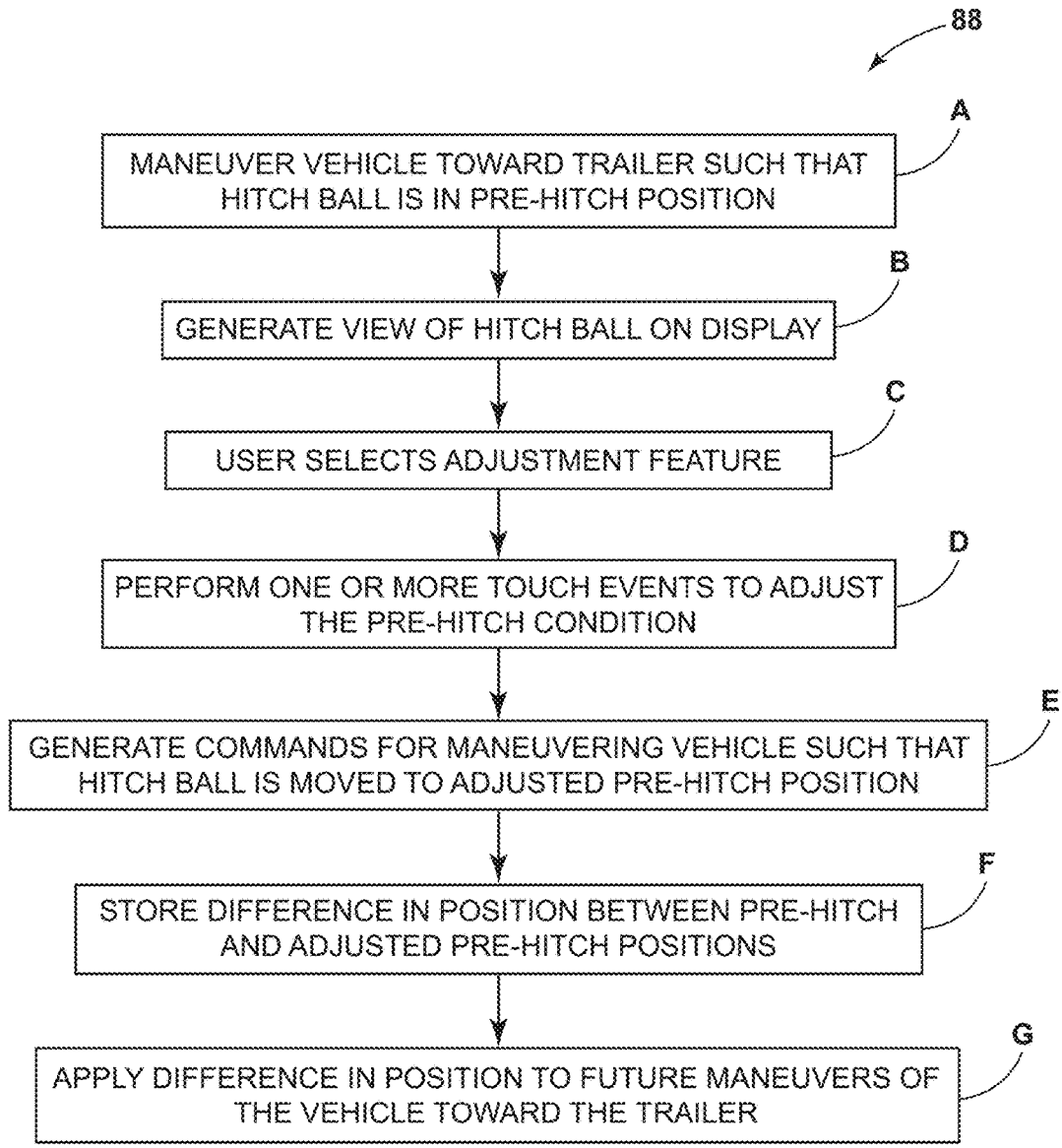
FIG. 3 is a flow diagram of a method for correcting misalignment between a tow hitch of the vehicle and a hitch coupler of the trailer.

Referring to FIG. 3, a method of correcting misalignment between a tow hitch (e.g., hitch ball 22) and a hitch coupler (e.g., coupler ball socket 26) is shown exemplarily embodied as operating routine 88. At step A, the vehicle 12 is maneuvered toward the trailer 14 such that the hitch ball 22 is in a pre-hitch position. In the pre-hitch position, the hitch ball 22 is generally proximate to the coupler ball socket 26 and may or may not be vertically aligned therewith. It is contemplated that the maneuvering of the vehicle 12 may occur manually, semi-autonomously, or autonomously. In semi-autonomous or autonomous embodiments of the system 10, the controller 38 generates commands provided to the vehicle brake control system 66, the powertrain control system 68, and/or the power assist steering system 52 to maneuver the vehicle 12 toward the trailer 14 so that the hitch ball 22 arrives at the pre-hitch position. In semi-autonomous embodiments, the driver of the vehicle 12 may be required to apply gas and/or apply the brakes while the controller 38 steers the vehicle 12.

At step B, a view 90 (FIG. 4) of the hitch ball 22 is generated on the display 84. The view 90 may be based on images captured by the imaging device 40. In some embodiments, the view 90 may be additionally generated based on information provided by positioning device 46, proximity sensors 44, and/or inertial system 47. It is to be understood that the view 90 may be generated on the display 84 at any time during the maneuvering of the vehicle 12 or once the vehicle 12 has come to a stop. In the depicted embodiment of FIG. 4, the view 90 corresponds to a top view showing the hitch ball 22 in the pre-hitch position proximate to the coupler ball socket 26. Ideally, the hitch ball 22 is vertically aligned with the coupler ball socket 26 at the pre-hitch position. However, for purposes of illustration, the hitch ball 22 is exemplarily shown misaligned with the coupler ball socket 26. For clarity purposes, an enlarged view of the misalignment between the hitch ball 22 and the coupler ball socket 26 is shown in FIG. 5. As shown, the hitch ball 22 is misaligned with the coupler ball socket 26 in a longitudinal direction (e.g., y-axis) and lateral direction (e.g., x-axis). Specifically, the hitch ball 22 is exemplarily shown to be located slightly past and to the left of the coupler ball socket 26. In such a scenario, it is difficult to connect the hitch ball 22 to the coupler ball socket 26 without repositioning the vehicle 12 and/or trailer 14. For purposes of clarity and understanding, the misalignment between the hitch ball 22 and the coupler ball socket 26 is exaggerated.

Figure 4:
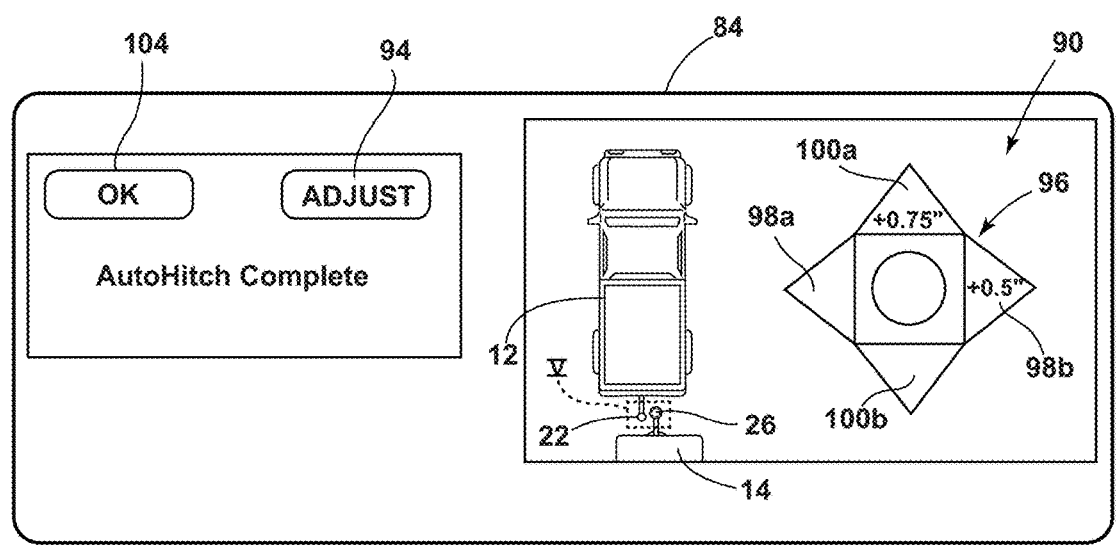
FIG. 4 illustrates a touch screen display displaying a view of the tow hitch in a pre-hitch position and a graphical icon generated on the display and having multiple touchpoints for allowing a user to adjust the pre-hitch position of the tow hitch.
Figure 5:
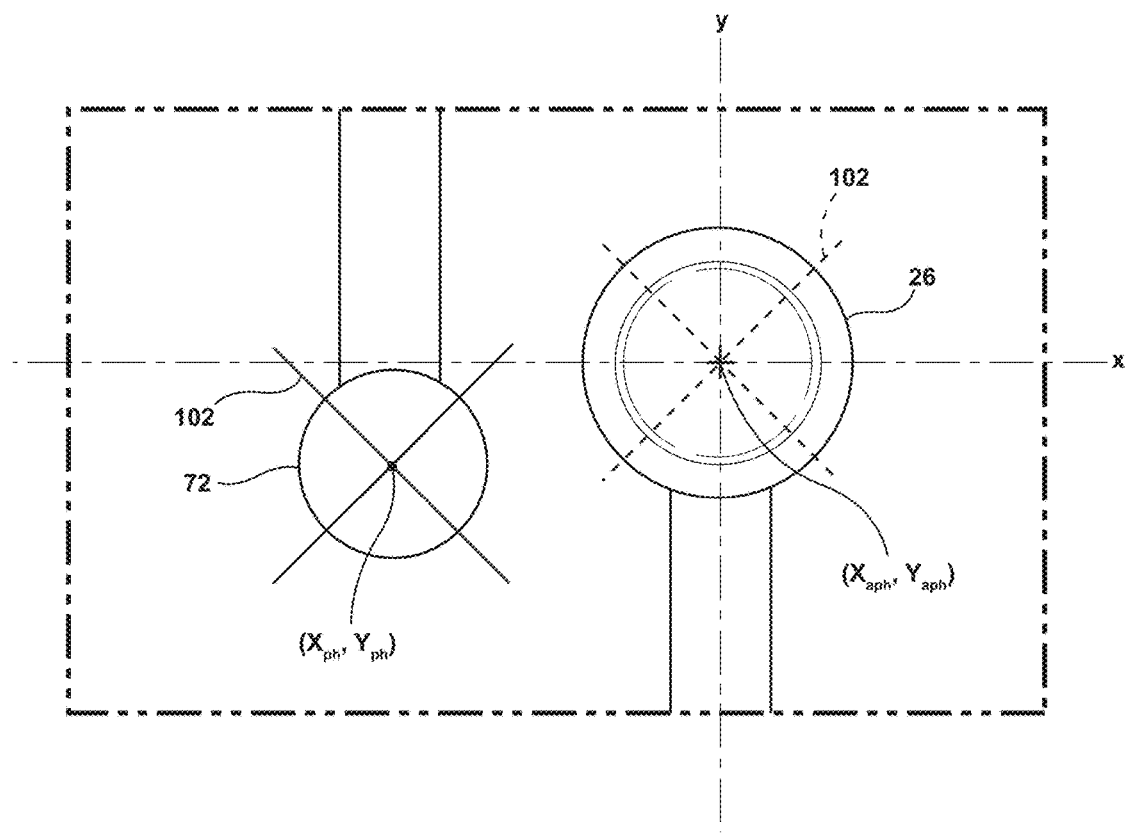
FIG. 5 is an enlarged view of area V shown in FIG. 4.

At step C, and assuming misalignment between the hitch ball 22 and the coupler ball socket 26, the user selects an adjustment feature 94, which is shown as a virtual button on the display 84 of FIG. 4. In response to registering a touch event on the adjustment feature 94, the display 84 is configured to generate a graphical icon 96 having multiple touchpoints 98a, 98b, 100a, 100b for allowing a user to adjust the pre-hitch position of the hitch ball 22 in relation to the coupler ball socket 26. In the depicted embodiment, touchpoints 98a and 98b are graphically represented as left and right arrows, respectively, and allow the user to adjust the pre-hitch position of the hitch ball 22 in a lateral direction. In contrast, touchpoints 100a and 100b are graphically represented as up and down arrows, respectively, and allow the user to adjust the pre-hitch position of the hitch ball in a longitudinal direction.

At step D, the user may perform one or more touch events on one or more of the touchpoints 98a, 98b, 100a, 100b to adjust the pre-hitch position of the hitch ball 22. For visual reference a cursor 102 (FIG. 5) or other graphic is generated on the display 84 to graphically represent the hitch ball 22. The cursor 102 initially coincides with the hitch ball 22 in the pre-hitch position and each touch event on a given touchpoint 98a, 98b, 100a, 100b incrementally moves the cursor 102 in the direction specified by the corresponding arrow. With respect to the scenario depicted in FIGS. 4 and 5, the user performs one or more touch events on each of touchpoints 98b and 100a to move the cursor 102 to an adjusted position at which the cursor 102 coincides with the coupler ball socket 26.

The pre-hitch position of the hitch ball 22, as given by coordinates $(X_{ph}, Y_{ph})$ of the cursor 102, and the adjusted pre-hitch position of the hitch ball 22, as given by coordinates $(X_{aph}, Y_{aph})$ of the cursor 102, may be stored by the controller 38 and may correspond to real-world coordinates of the hitch ball 22 determined by the controller 38 based on captured images, positional data supplied by onboard or remote devices, and/or other sources of information known by a skilled artisan. Additionally, the controller 38 may determine a difference in position between the pre-hitch and adjusted pre-hitch positions of the hitch ball 22. For visual reference, the graphical icon 96 is configured to display the difference in position between the pre-hitch position and the adjusted pre-hitch position. For example, a difference in position (e.g., +0.75 inches) in the longitudinal direction may be generated on touchpoint 100a and a difference in position (e.g., +0.5 inches) in the lateral direction may be generated on touchpoint 98b. Once the user is satisfied with the adjusted pre-hitch position of the hitch ball 22, the user may confirm the selection by touching virtual button 104.

At step E, the controller 38 generates commands for maneuvering the vehicle 12 such that the hitch ball 22 is moved to the adjusted pre-hitch position at which the hitch ball 22 is aligned with the coupler ball socket 26. As described herein, the maneuvering of the vehicle 12 may occur autonomously or semi-autonomously. In alternative embodiments, steps C and D may be omitted. Instead, the driver is instructed to manually maneuver the vehicle 12 to move the hitch ball 22 from the pre-hitch position to a desired position. In turn, the controller 38 may determine the difference in position between the pre-hitch and desired positions of the hitch ball 22.

At step F, the controller 38 stores the difference in position as calibration data for future use. The difference in position may be stored to memory 86 and may be applied to future maneuvers of the vehicle 12 toward the trailer 14 at step G. In some embodiments, the stored difference in position may be trailer specific and is exclusively applied to the specific trailer. This approach is particularly useful when common misalignment issues are only associated with one specific trailer. Alternatively, the difference in position may be applied to future maneuvers of the vehicle 12 toward any trailer. This approach is particularly useful when common misalignment issues arise across multiple different trailers. By storing the difference in position, repeated misalignment issues can be eliminated.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A hitch assist system comprising:
   a human machine interface configured to receive user-input for adjusting a pre-hitch position of a tow hitch of a vehicle; and
   a controller configured to generate commands for maneuvering the vehicle such that the tow hitch is moved to an adjusted pre-hitch position at which the tow hitch is aligned with a hitch coupler of a trailer, wherein the controller is configured to determine a difference in position between the pre-hitch position and the adjusted pre-hitch position and the controller stores the difference in position to memory and applies the difference in position to future maneuvers of the vehicle toward the trailer.

2. The hitch assist system of claim 1, wherein the human machine interface comprises a touchscreen display configured to display a view of the tow hitch in the pre-hitch position and register one or more touch events thereon for adjusting the pre-hitch position of the tow hitch.

3. The hitch assist system of claim 2, wherein the touchscreen display is configured to generate a graphical icon having multiple touchpoints for adjusting the pre-hitch position of the tow hitch.

4. The hitch assist system of claim 3, wherein the touchpoints allow adjustment of the pre-hitch position in at least one of a lateral direction and a longitudinal direction.

5. The hitch assist system of claim 4, wherein the graphical icon is configured to display a difference in position between the pre-hitch position of the tow hitch and the adjusted pre-hitch position of the tow hitch.

6. The hitch assist system of claim 3, wherein the touchscreen display is configured to generate an indicator graphically representing the pre-hitch position of the tow hitch and movable in response to each touch event.

7. The hitch assist system of claim 6, wherein the touchpoints are graphically represented as arrows and each touch event on a given touchpoint incrementally moves the indicator in a direction specified by the corresponding arrow.

8. The hitch assist system of claim 1, wherein the tow hitch comprises a hitch ball and the hitch coupler comprises a coupler ball socket.

9. A human machine interface of a vehicle having a tow hitch, comprising:
   a touchscreen display configured to display a view of the tow hitch in a pre-hitch position proximate a hitch coupler of a trailer and register one or more touch events thereon for adjusting the pre-hitch position of the tow hitch to correct misalignment between the tow hitch and the hitch coupler, wherein the touchscreen display is configured to generate a graphical icon having multiple touchpoints for adjusting the pre-hitch position of the tow hitch.

10. The human machine interface of claim 9, wherein the touchpoints allow adjustment of the pre-hitch position in at least one of a lateral direction and a longitudinal direction.

11. The human machine interface of claim 10, wherein the graphical icon is configured to display a difference in position between the pre-hitch position of the tow hitch and an adjusted pre-hitch position of the tow hitch.

12. The human machine interface of claim 9, wherein the touchscreen display is configured to generate an indicator graphically representing the pre-hitch position of the tow hitch and movable in response to each touch event.

13. The human machine interface of claim 12, wherein the touchpoints are graphically represented as arrows and each touch event on a given touchpoint incrementally moves the indicator in a direction specified by the corresponding arrow.

14. A method of correcting misalignment between a tow hitch of a vehicle and a hitch coupler of a trailer, comprising the steps of:
   receiving user-input via a human machine interface for adjusting a pre-hitch position of the tow hitch;
   providing a controller for generating commands for maneuvering the vehicle such that the tow hitch is moved to an adjusted pre-hitch position at which the tow hitch is aligned with the hitch coupler;
   determining a difference in position between the pre-hitch position of the tow hitch and the adjusted pre-hitch position of the tow hitch;
   storing the difference in position to memory; and
   applying the difference in position to future maneuvers of the vehicle toward the trailer.

* * * * *